(12) United States Patent
Kim et al.

(10) Patent No.: US 11,709,840 B2
(45) Date of Patent: *Jul. 25, 2023

(54) METHOD FOR MANAGING DATABASE

(71) Applicant: TMAXSOFT CO., LTD, Gyeonggi-do (KR)

(72) Inventors: Donghyeon Kim, Gyeonggi-do (KR);
Minhyeok Lee, Gyeonggi-do (KR);
Wonjun Jeong, Gyeonggi-do (KR);
Byungmin Ahn, Gyeonggi-do (KR)

(73) Assignee: TMAXSOFT CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,805

(22) Filed: Sep. 3, 2021

(65) Prior Publication Data

US 2021/0397618 A1 Dec. 23, 2021

Related U.S. Application Data

(63) Continuation of application No. 16/383,133, filed on Apr. 12, 2019, now Pat. No. 11,138,197.

(30) Foreign Application Priority Data

Apr. 10, 2019 (KR) .......................... 10-2019-0041842

(51) Int. Cl.
*G06F 16/2455* (2019.01)
*G06F 16/242* (2019.01)
*G06F 16/28* (2019.01)

(52) U.S. Cl.
CPC ...... *G06F 16/24552* (2019.01); *G06F 16/242* (2019.01); *G06F 16/282* (2019.01)

(58) Field of Classification Search
CPC ............. G06F 16/24552; G06F 16/242; G06F 16/282; G06F 16/214; G06F 16/284
See application file for complete search history.

(56) References Cited

U.S. PATENT DOCUMENTS 4,888,690 A    12/1989  Huber
6,973,457 B1 * 12/2005  Bastawala ......... G06F 16/24552
                                                707/999.102

(Continued)

FOREIGN PATENT DOCUMENTS

EP    1121655 B1    7/2006
EP    1736899 B1    4/2012

(Continued)

OTHER PUBLICATIONS

Korea Intellectual Property Office, Office Action, dated Jun. 23, 2020.

*Primary Examiner* — Dangelino N Gortayo
(74) *Attorney, Agent, or Firm* — Umberg Zipser LLP

(57) ABSTRACT

Disclosed is a computer program stored in a computer-readable medium according to an exemplary embodiment of the present disclosure. When the computer program is executed by one or more processors, the computer program allows the following operations for data caching to be performed and the operations may include an operation of generating a cache, an operation of caching at least some of the segments and at least one of records to the cache, an operation of reading the cache when receiving an inquiry request from a client, an operation of determining to read a cursor based on whether there is a segment or record corresponding to the inquiry request in the cache; and an operation of determining whether a query for at least one of a relational database and a hierarchical database is generated based on whether there is the segment or record in the cursor.

12 Claims, 6 Drawing Sheets

(56) References Cited

U.S. PATENT DOCUMENTS

| | | | |
|---|---|---|---|
| 7,366,708 B2 | 4/2008 | Jalali et al. | |
| 7,610,351 B1 * | 10/2009 | Gollapudi | H04L 67/5681 |
| | | | 709/217 |
| 9,582,375 B2 * | 2/2017 | Bastawala | H04L 67/01 |
| 9,959,325 B2 * | 5/2018 | Oliver | G06F 16/2471 |
| 2004/0015504 A1 | 1/2004 | Ahad et al. | |
| 2012/0310918 A1 * | 12/2012 | Johri | G06F 16/2456 |
| | | | 707/E17.054 |
| 2013/0198249 A1 | 8/2013 | Hoang et al. | |
| 2020/0125582 A1 * | 4/2020 | O'Shaughnessy | G06F 16/245 |

FOREIGN PATENT DOCUMENTS

| | | |
|---|---|---|
| JP | 2009265840 A | 11/2009 |
| JP | 2011159326 A | 8/2011 |
| JP | 6236305 B2 | 11/2017 |
| KR | 1020010093777 A | 10/2001 |
| KR | 100478586 B1 | 3/2005 |

\* cited by examiner

METHOD FOR MANAGING DATABASE

CROSS-REFERENCE TO RELATED APPLICATIONS

This application is a continuation application of U.S. patent application Ser. No. 16/383,133 filed on Apr. 12, 2019, which itself claims priority to and the benefit of Korean Patent Application No. 10-2019-0041842 filed in the Korean Intellectual Property Office on Apr. 10, 2019, the entire contents of which are incorporated herein by reference.

TECHNICAL FIELD

The present disclosure relates to a database system, and more particularly, to a method for caching data between heterogeneous databases.

BACKGROUND ART

As computers and Internet technologies are developed, databases for storing large amounts of data efficiently and quickly and easily searching for the data under desired search conditions are becoming increasingly important. Current database systems allow storing and retrieving a large amount of information.

When the database includes a large amount of data, it may take a relatively long time to perform a query for calling data in which a user is interested. When it takes a long time for the database to respond to the query, it may adversely affect performance of the database.

When the same data inquiry request exists in a repeated pattern in the process of operating a database system for migration of heterogeneous databases, it takes a relatively long time to call data when issuing the query every time there is an inquiry request. In general, a relational database system processes an inquiry request by using a cursor. However, if there is an inquiry request for multiple records contained in a table after a single record inquiry request, it takes time to process the query if the cursor is initialized and the cursor is again generated to issue the query. Therefore, when the same data inquiry request includes a large number of records, the query is issued by opening the cursor each time there is the inquiry request, so that the processor may be lower in processing the inquiry request and adversely affect the performance of the database.

Korean Patent Registration (Registration No. KR10-0478586) discloses a data caching method in the relational database.

SUMMARY OF THE INVENTION

The present disclosure has been made in an effort to rapidly and efficiently perform data retrieval in a database system.

An exemplary embodiment of the present disclosure provides a computer program stored in a computer readable storage medium. When the computer program is executed by one or more processors, the computer program allows the following operations for data caching of a database to be performed and the operations may include an operation of generating a cache, an operation of caching at least some of the segments and at least one of records to the cache, an operation of reading the cache when receiving an inquiry request from a client, an operation of determining to read a cursor based on whether there is a segment or record corresponding to the inquiry request in the cache; and an operation of determining whether a query for at least one of a relational database and a hierarchical database is generated based on whether there is the segment or record in the cursor.

In an alternative exemplary embodiment, the segment may be a node in a hierarchical database mapped to a table in a relational database.

In an alternative exemplary embodiment, the caching at least a part of the segments and at least one of records in the cache may include storing the record corresponding to a key condition in the cache when the inquiry request that includes the condition is received, and storing at least a part of the segments in the cache when the inquiry request that does not include a key condition is received.

In an alternative exemplary embodiment, the storing at least a part of the segments in the cache when the inquiry request that does not include a key condition is received may include storing a record contained in a parent segment and a child segment of a record included in the parent segment in the cache.

In alternative exemplary embodiment, the operations may include removing at least one of records stored in the cache from the cache based on a predetermined criterion.

In an alternative exemplary embodiment, the reading the cache when receiving an inquiry request from a client may include reading a record corresponding to the key condition from the cache when the inquiry request includes a key condition; and reading a segment corresponding to a parent record identified in the inquiry request from the cache when the inquiry request does not include a key condition.

In an alternative exemplary embodiment, the determining to read a cursor based on whether a segment or a record corresponding to the inquiry request exists in the cache may include determining not to read the cursor and returning a segment or a record corresponding to the inquiry request, when there is a segment or a record corresponding to the inquiry request in the cache.

In an alternative exemplary embodiment, the determining to read a cursor based on whether a segment or a record corresponding to the inquiry request exists in the cache may include determining to read a cursor when the cache does not include a segment or a record corresponding to the inquiry request.

In an alternative exemplary embodiment, the determining whether to generate a query for at least one of a relational database and a hierarchical database based on whether the segment or the record exists in the cursor may include determining not to generate the query when the segment or the record exists in the cursor, and determining to generate the query when at least one of the segments or the record does not exist in the cursor.

In an alternative exemplary embodiment, the operations may further include storing in the cache at least one of the segments or the record, in response to the query or when obtaining a segment or a record from the cursor.

Another exemplary embodiment of the present disclosure provides a method for caching data of a database. The method may include: generating a cache by allocating a cache space for storing at least a part of segments stored in a hierarchical database; caching at least a part of the segments records in the cache; reading the cache when receiving an inquiry request from a client; determining to read a cursor based on whether a segment or a record corresponding to the inquiry request exists in the cache; and determining whether to generate a query for at least one of a relational database and a hierarchical database based on whether the segment or the record exists in the cursor.

Yet another exemplary embodiment of the present disclosure provides a computing device. The computing device may include: a processor including one or more cores; and a memory storing command executable in the processor, in which the processor may be configured to generate a cache by allocating a cache space for storing at least a part of segments stored in a hierarchical database, cache at least a part of the segments in the cache, determine to read a cursor based on whether a segment or a record corresponding to the inquiry request exists in the cache and determine whether to generate a query for at least one of a relational database or a hierarchical database based on whether the segment or the record exists in the cursor.

According to an exemplary embodiment of the present disclosure, a method for caching data in a database system may be provided.

DETAILED DESCRIPTION

Figure 1:
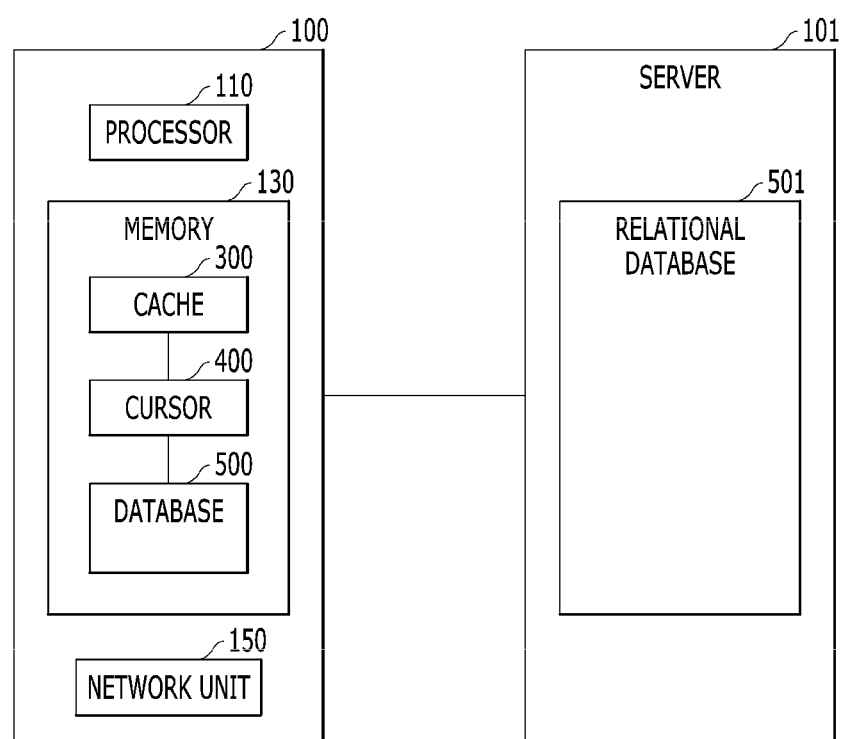
FIG. 1 is a block diagram of a computing device for caching data according to an exemplary embodiment of the present disclosure.

Various exemplary embodiments will now be described with reference to drawings. In the present specification, various descriptions are presented to provide appreciation of the present disclosure. However, it is apparent that the embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, or the case where X uses both A and B. Further, it should be understood that the term "and/or" used in the specification designates and includes all available combinations of one or more items among enumerated related items.

It should be appreciated that the term "comprise" and/or "comprising" means that presence of corresponding features and/or components. However, it should be appreciated that the term "comprises" and/or "comprising" means that presence or inclusion of one or more other features, components, and/or a group thereof is not excluded. Further, when not separately specified or not clear in terms of the context that a singular form is indicated, it should be construed that the singular form generally means "one or more" in the present specification and the claims.

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

FIG. 1 is a block diagram of a computing device for caching data according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 first reads a cache 300 in order to return data in response to an inquiry request. When there is no segment and/or record satisfying the inquiry request in the cache 300, the processor 110 reads a cursor 400. The processor 110 may issue a query to a database 500 and/or a relational database 501 when the cursor 400 does not have the segment and/or record satisfying the inquiry request. The database 500 may be a hierarchical database. The hierarchical database may be a relationship in which a record is mapped to a relational database existing in a server 101. When the processor 110 issues the query to the server 101, the query may be sent via the network unit 150. When the server 101 reads and returns a segment and/or a record satisfying the query, the computing device 100 may receive segments and/or records through the network unit 150. The segment and/or record received via the network unit 150 may be stored in the cache 300 or the cursor 400 and returned to a user.

The processor 110 may perform an operation for caching data. The processor 110 may generate a cache by allocating a cache space for storing at least some of the segments stored in the hierarchical database. The hierarchical database may be a database having a hierarchical structure in which the records are stored in a segment having a hierarchical structure. The hierarchical database may be a structure in which the segment is linked to a parent segment and a child segment. In the hierarchical database, one parent segment may be linked to at least one child segment.

The cache 300 as a storage space occupying a partial space of the memory 130 may be a storage space for reducing input and/or output time when an input/output operation in/from the database is performed. The memory 130 in this disclosure may include both a main memory and a persistent storage of the computing device. That is, in an exemplary embodiment of the present disclosure, the cache 300 may reside on main memory and may reside on the persistent storage.

The processor 110 may allocate a cache space for each segment of the hierarchical database in order to cache at least a part of the hierarchical database. The processor 110 allocates the cache space for each segment of the hierarchical database to create the cache 300 so that when the processor 110 accesses the cache 300 and acquires the record contained in the record or segment, the processor 110 may support search based on the structure of the hierarchical database in the cache 300. In addition, the processor 110 may allocate a cache space for storing only the record, not the hierarchical structure and the segment structure of the hierarchical database. A part of the cache 300 stores only the record, and as a result, when an inquiry in units of the record rather than an inquiry in units of the segment occurs, the processor 110 may acquire the record from the cache 300 and return the record.

By allocating the cache 300 for each segment, a frequency at which operations such as reading, writing, deleting, etc., are performed in the cache 300 is reduced and the number of times the segments and/or records stored in the cache 300 are changed is reduced. Accordingly, the amount of computation of the processor 110 is reduced to expect enhancement of a search speed. When the cache is operated for a database including not a single segment but all segments, since a difficulty in implementing a complex algorithm for efficiently managing a separate high-performance cache manager, a large-capacity cache storage space, and segments and/records stored in the cache and a programming language for executing an algorithm and an excessive computation amount for executing the algorithm are required, thereby achieving easiness of cache management and enhancement of the search speed by allocating the cache for each segment.

In an exemplary embodiment of the present disclosure, the segment may be a node of the hierarchical database mapped with a table of the relational database. The relational database may be a collection of a table constituted by rows and columns and other tables are related and collected. In the present disclosure, the segment may refer to at least some of the records included in the segment. The row may be a tuple and/or the record. Further, the column may be a field and/or an attribute. The aforementioned row or column is just an example and the present disclosure is not limited thereto. Mapping may be matching the record existing in the relational database table to the record existing in the hierarchical database segment.

In an exemplary embodiment of the present disclosure, the processor 110 may perform an operation of caching at least some of the segments and at least one of the records to the cache. The processor 110 may cache at least one of the segments and the records that are inquired in the cache 300 based on the inquiry request. When the inquiry request includes a key condition and is the inquiry request for the record, the processor 110 may read the corresponding record from the database and cache the read record to the cache 300. When the inquiry request does not include the key condition and needs to return the segment, the processor 110 may read the corresponding segment from the database and cache the read segment to the cache 300.

Figure 2:
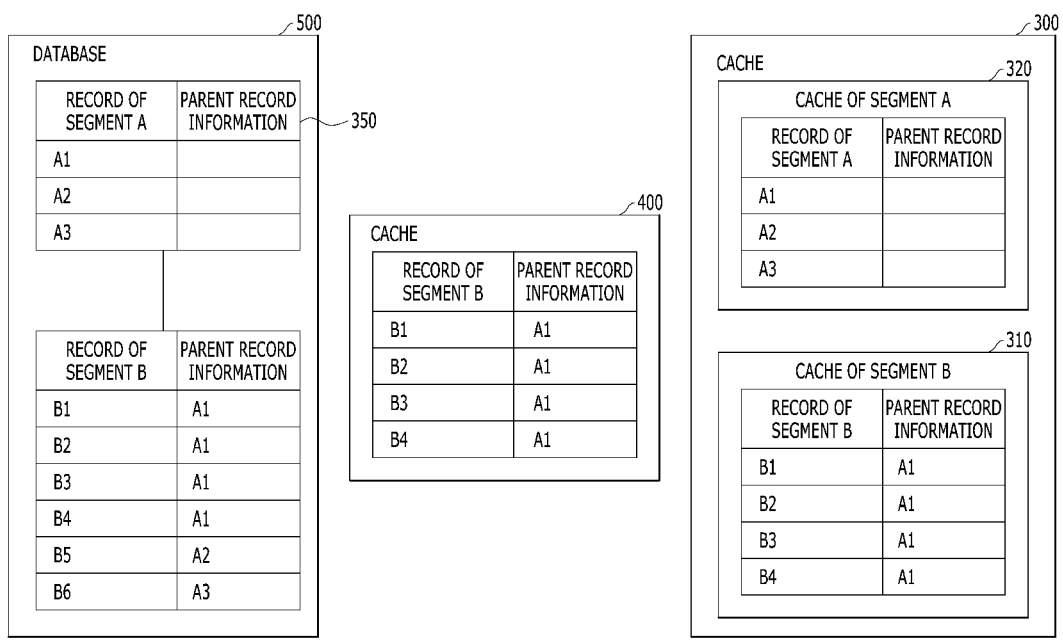
FIG. 2 is an exemplary diagram for describing an operation of storing data in a cache according to an exemplary embodiment of the present disclosure.

In an exemplary embodiment of the present disclosure, the processor 110 may perform an operation of storing, in the cache, a record corresponding to the key condition when the inquiry request including the key condition is received. The inquiry request including the key condition may be a request for a specific record stored in the segment. The processor 110 may inquire and acquire the record corresponding to the key condition from the database and store the acquired record in the cache when the inquiry request including the key condition is received. As illustrated in FIG. 2, the inquiry request including the key condition may be, for example, a record inquiry request in which the parent record is A1 and the child record is B3.

In an exemplary embodiment of the present disclosure, when the inquiry request does not include the key condition and needs to return the segment, the processor 110 may read the corresponding segment from the database and store the read segment in the cache 300. The inquiry request not including the key condition may be a request for inquiring a child segment connected to a specific record included in the parent segment and a specific record included in the parent segment. As illustrated in FIG. 2, the inquiry request not including the key condition may be, for example, a request for inquiring a segment in which the parent record is A1. In this case, the processor 110 stores a segment satisfying an inquiry command in the cache to rapidly process a subsequent inquiry request. The aforementioned inquiry request is just an example and the present disclosure is not limited thereto.

In an exemplary embodiment of the present disclosure, the processor 110 may perform an operation of storing, in the cache 300, the child segment of the record included in the parent segment when the inquiry request not including the key condition is received. When the inquiry request not including the key condition is received, the processor 110 may return all records of the child segment for the specific record. In this case, the processor 110 may store in the cache 300 at least some of the records of the child segment and parent records of the respective records, and information on the segment.

In an exemplary embodiment of the present disclosure, the processor 110 may perform an operation of excluding at least one record stored in the cache from the cache based on a predetermined criterion. The predetermined criterion may be a criterion for deleting some of the records stored in the cache and storing new records in a situation where the processor 110 stores the records in the cache. The predetermined criterion may include, for example, a scheme of using a queue data structure using a first-in first-out scheme, such that a record first entered in the cache is first deleted from the cache. The predetermined criteria may also include, for example, a method for updating new record data based on the number of times and/or dates at which the record stored in the cache is accessed for a predetermined time. The predetermined criterion is just an example and the present disclosure is not limited thereto. When the cache is managed according to the predetermined criterion, the storage space allocated to the cache 300 may be efficiently used. Accordingly, since an inquiry request with a high frequency may be processed in the cache, enhancement of a data processing speed may be expected while using a limited storage.

In an exemplary embodiment of the present disclosure, the processor 110 may read the cache 300 when receiving the inquiry request from a client. The inquiry request may be a request for accessing the segment and the record included in the database as described above or a transaction issued by the client. The client may be the computing device 100 that makes a data inquiry request and accepts return of data. The inquiry request may be a transaction issued by the processor 110 to obtain data from the database 500 or the relational database 501 by the processor 110.

In an exemplary embodiment of the present disclosure, the processor 110 may read the record corresponding to the key condition in the cache when the inquiry request includes the key condition at the time of receiving the inquiry request from the client. Further, in an exemplary embodiment of the present disclosure, the processor 110 may read the segment corresponding to the parent record identified in the inquiry request in the cache when the inquiry request does not include the key condition at the time of receiving the inquiry request from the client.

In an exemplary embodiment of the present disclosure, the processor 110 may determine whether to read the cursor based on whether the segment or record corresponding to the inquiry request exists in the cache. The cursor 400 may be configured by the storage space allocated onto the memory 130. In addition, the cursor 400 may be a storage space implemented on the memory 130 to store a result value (e.g., the record or all records included in the segment) for the query and access to the result value by the unit of the record sequentially at the time when the result value is required. The processor 110 may issue a predetermined query in order to request the record or segment to the database. The query may include a cursor query for reading the record and the segment from the database by generating the cursor. The cursor query may be a query for requesting the segment and/the record to the database and the cursor 400 may be a space storing the result value for the query. The processor 110 may change the segment and/or the record stored in the cursor 400 through the cursor query. The processor 110 may call a single record included in the segment one by one by using a Loop command included in the cursor query and store the single record in the cursor 400 one by one. The Loop command may include a command calling the single record therein. The Loop command may be a command that repeatedly performs a specific command until a specific condition is satisfied. For example, the Loop command may be WHILE and For commands. The cursor query may delete data stored in the cursor 400 using a cursor close command. The cursor close command is generally executed after the Loop command ends. The detailed description of the query described above is just an example and the present disclosure is not limited thereto.

Since the processor 110 may sequentially access the result value by executing the cursor query, the processor 110 needs to initialize data stored in the cursor 400 while calling the parent record in a situation of sequentially inquiring the record in the child segment. The result value may be the segment and/or record satisfying the cursor query when the computing device 100 issues the cursor query. The cursor query may be a command to allow the processor 110 to request the record and/or segment to the database 500 and the relational database 501 and be returned the requested record and/or segment and store the record and/or segment in the cursor 400. The situation of sequentially inquiring the record may be a situation in which the processor 110 inquires the records included in the segment according to an order in which the records are aligned. For example, when the records are aligned in the ascending order for an attribute such as a resident registration number, the processor 110 may inquire records in the ascending order. When the computing device 100 receives a request for inquiring the parent record of the segment in a situation in which the processor 110 reads the records included in the segment one by one sequentially, the computing device 100 needs to issue a new query. A situation in which the processor 110 sequentially inquires the records of the child segment in the cursor 400 may be, for example, a situation in which the records are inquired in the order of B, C, and D from record A when the records are sequentially stored in the child segment in the order of A, B, C, D, and E.

The processor 110 may initialize the cursor 400. For example, as illustrated in FIG. 2, when there is an inquiry request without a key condition, which requests a segment in which the parent record is A1, the processor 110 may store the segment in which the parent record is A1 in a segment B cache 310. After the processor 110 stores the segment, when there is an inquiry request requesting segment A, the processor 110 issues a new query, so that the segment in the current cursor 400 may be initialized. In the same situation, in an exemplary embodiment of the present disclosure, as illustrated in FIG. 2, the processor 110 reads the cache 320 of segment A and when segment A is stored in the cache, the processor 110 need not issue the query, thereby enhancing the data search speed.

Thus, when the segment and/or record in the cursor 400 is initialized, the processor 110 needs to repeat a process of issuing the query and storing the segment and/or record in the cursor 400 again. Here, when the processor 110 issues the query, network communication is made through a handshaking scheme, and as a result, a network connection time is required. Further, when the processor 110 issues the query, a time for reading the large-capacity database is also required in order to perform the query. Therefore, it is important to issue as few queries as possible for performance enhancement of the database.

Even when the cursor 400 may be initialized as described above, the cache 300 may hold the segment and/or record for each segment. Accordingly, when there is a query request for calling segment A in a state where segment B is stored in the cursor 400, the processor 110 may return segment A stored in the cache allocated to segment A, and as a result, an inquiry frequency for the cursor 400 may be reduced and the need to issue a new query may be reduced. Since the inquiry frequency for the cursor 400 is reduced, a situation in which the cursor 400 needs to be initialized may occur less. Therefore, the processor 110 may avoid the situation in which the cursor 400 may be initialized to the utmost. Since the deletion and creation of the cursor 400 are not repeated in the database, a drop in performance may not occur. Therefore, by using a caching technique of the present disclosure, the search speed and efficiency for the database may be enhanced by suppressing the issuing of the query.

In an exemplary embodiment of the present disclosure, the processor 110 may include an operation of determining not to read the cursor and returning the segment or record corresponding to the inquiry request when there is the segment or record corresponding to the inquiry request in the cache. When there is the segment or record corresponding to the inquiry request in the cache 300, the processor 110 acquires and returns the segment or record, so that the processor 110 may not read the cursor 400. When there is no segment or record corresponding to the inquiry request in the cache 300, the processor 110 may read the cursor 400. For example, when the segment corresponding to the inquiry request is A and the record corresponding to the inquiry request is B, if A or B exists in the cache 300, the processor 110 returns A or B in the cache 300 and does not read the cursor 400. The description of the segment and record described above is just an example and the present disclosure is not limited thereto.

In an exemplary embodiment of the present disclosure, when there is no segment or record corresponding to the inquiry request in the cache, the processor 110 may include the operation of determining to read the cursor. For example, when the segment corresponding to the inquiry request is A and the record corresponding to the inquiry request is B, if A or B does not exist in the cache 300, the processor 110 reads whether A or B exists in the cursor 400. When the query is immediately issued without reading the cursor 400 in such a situation, a time for reading and returning the segment or record corresponding to the inquiry request in the database is required, thereby increasing a data search period. Accordingly, by inquiring the cursor before issuing the query, efficiency of the search may be increased by reducing the search time.

In an exemplary embodiment of the present disclosure, the processor 110 may determine whether the query for at least one of the relational database and the hierarchical database is generated based on whether there is the segment or record in the cursor. The query may be a command to request data (e.g., the record and the segment) to the database. The query may be a query statement or a structured query language (SQL) statement. The SQL statement may include a data manipulation language (DML), a data definition language (DDL), a data control language (DCL), and a select command. The DML may be a command to operate data and may include commands such as insert, delete, update, etc. The DDL may be a command to define data and may include commands such as create, truncate, etc. The DCL may be a command to control data and may include commands such as grant, commit, revoke, etc. The aforementioned queries are just examples and the present disclosure is not limited thereto.

In an exemplary embodiment of the present disclosure, the processor 110 may determine whether the query for at least one of the relational database and the hierarchical database is generated based on whether there is the segment or record in the cursor and when there is the segment or record in the cursor, the processor 110 may determine not to generate the query.

In an exemplary embodiment of the present disclosure, the processor 110 may generate the query when at least one of the segment and the record does not exist in the cursor.

In an exemplary embodiment of the present disclosure, the processor 110 may store in the cache at least one of the segment or the record in response to the query or when obtaining the segment or record from the cursor. The processor 110 may store the segment or record in the cursor 400 when obtaining the segment or record in response to the query. Further, the processor 110 may store the segment or the record stored in the cursor 400 in the cache 300.

In a method for caching data in accordance with an exemplary embodiment of the present disclosure, by adding the cache 300 to the memory 130, even in a situation in which the cursor 400 may be initialized, the processor 110 returns data in the cache 300 to reduce an initialization frequency of the cursor 400, thereby enhancing the search speed and efficiency of the data by reducing the number of issuing times of the query.

The memory 130 may include the cache 300, the cursor 400, and the database 500. The memory 130 may include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but is not limited thereto.

In an exemplary embodiment of the present disclosure, the cache 300, the cursor 400, and the database 500 may be stored in a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information. The aforementioned matters are just examples and the present disclosure is not limited thereto.

The network unit 150 may include a transmission unit and a reception unit. The network unit may include a wired/wireless Internet module for network access. As the wireless Internet technology, wireless LAN (WLAN) (Wi-Fi), wireless broadband (Wibro), world interoperability for microwave access (Wimax), high speed downlink packet access (HSDPA), or the like, may be used. As wired Internet technology, a digital subscriber line (XDSL), fibers to the home (FTTH), power line communication (PLC), or the like may be used.

The network unit 150 may be positioned at a comparatively short distance from the service processing apparatus including a short range communication module and transmit and receive data to and from an electronic apparatus including the short range communication module. As short-range communication technology, Bluetooth, radio frequency identification (RFID), infrared data association (IrDA), ultra wideband (UWB), ZigBee, or the like may be used. In an exemplary embodiment of the present disclosure, the network unit may sense a connection status of the network and transmission and reception speeds of the network. Data received through the network unit may be stored through the memory or transmitted to other electronic apparatuses positioned in a short range through the short-range communication module.

The network unit 150 may exchange information with another computing device in order to perform a caching method in the database in an exemplary embodiment of the present disclosure. The exchanged information may include the query issued by the processor 110, the inquiry request from the client, and data (e.g., the segment, the record, etc.) from another database.

In an exemplary embodiment of the present disclosure, when the processor 110 issues the query, the query may be transmitted to the network unit 150. The network unit 150 may send the transmitted query to another computing device. For example, when the processor 110 issues the query for the inquiry request that does not include the key condition, the network unit 150 may receive the query and send the query to another server 101. The network unit 150 may receive data when another computing device sends data in response to the query sent by the network unit 150. For example, the server 101 may return the record satisfying the query to the network unit 150 in response to the query sent by the network unit 150. The network unit 150 may deliver the received data to the memory 130. For example, when the network unit 150 receives the record, the processor 110 may store the record in the cache 300, the cursor 400, and the database 500. The aforementioned operations of the network unit 150 are just examples and the present disclosure is not limited thereto.

FIG. 2 is an exemplary diagram for describing an operation of storing data in a cache according to an exemplary embodiment of the present disclosure.

The database 500 may include the hierarchical database and as illustrated in FIG. 2, a plurality of segments may constitute the hierarchical structure. In the example illustrated in FIG. 2, in the database 500, segment A and segment B may have the hierarchical structure. The cache 300 may include the storage space configured for each segment. As illustrated in FIG. 2, the cache 300 may include a cache 320 of segment A and a cache 310 of segment B. The segments and/or records stored by the database 500 and the cache 300 are just examples and the present disclosure is not limited thereto.

In an exemplary embodiment of the present disclosure, parent record information 350 included in the segment may include parent record information of each record included in the segment. For example, the parent record of record B1 may include information A1. The parent record information 350 included in the segment may include a foreign key of the child segment. The aforementioned parent record information is just an example and the present disclosure is not limited thereto.

The cache 300 may be the storage space allocated onto the memory 130. Further, the cache 300 may be the storage space allocated to the main memory or the persistent storage of the computing device. The cache 300 may include the storage space allocated to correspond to the segment of the hierarchical database. For example, the cache 300 may be configured for each segment of the hierarchical database. For example, the cache 300 may include each segment of the hierarchical database. The cache 300 may store each segment of the hierarchical database and may be configured in a data structure correspond to each segment of the hierarchical database.

As illustrated in FIG. 2, when the same inquiry request for the parent record is repeated by allocating the cache for each segment, the processor 110 reads the cache 300 without generating the cursor again and returns the segment and/or record to reduce the number of issuing times of the query, thereby enhancing the performance of the database. For example, when there is the inquiry request not including the key condition in which the parent record is A1, the processor 110 stores the child segment of record A1 in the cache 310 of segment B. In addition, when there is an inquiry request with a key condition, which requests specific record B3 in which the parent record is A1, the processor 110 reads the cache 310 of segment B and returns record B3. Accordingly, when parents of previous and next inquiry requests are the same as each other, the cache 310 of segment B is maintained similarly, thereby enhancing the search speed of the processor 110.

As illustrated in FIG. 2, the segment and/or record may be stored in the cache 310 of segment B. For example, when the inquiry request without the key condition calls the child segment of record A1, records B1, B2, B3, and B4 may be sequentially stored in segment B by the processor 110 in the cache. Thereafter, when the inquiry request without the key condition calls the child segment of record A1, the processor 110 may return records B1, B2, B3, and B4 stored in the cache 310 of segment B. Therefore, even in a situation in which an inquiry command to call the child segment of record A1 and an inquiry command to call single record A2 coexist, the processor 110 may return the segment satisfying the inquiry request by reading the cache 310 of segment B without issuing a query for calling the child segment of record A1. Since a situation in which the same inquiry request without the key condition is repeated actually frequently occurs, the number of issuing times of the query may be reduced through the caching method of the present disclosure.

The processor 110 may perform an operation of sequentially storing records in the cache 310 of segment B. When the processor 110 issues the cursor query, the processor 110 may sequentially read the records included in the segment. For example, in the case of reading segment B, the processor 110 starts reading the record from B1 and reads the record up to B6. In this case, the processor 110 may sequentially store the single record in the cursor 400 one by one. The processor 110 may sequentially store the single record in the cursor 400 and thereafter, store the same record even in the cache 310 of segment B. For example, when the processor 110 stores single record B1 in the cursor 400, the processor 110 may store record B1 even in the cache 310 of segment B similarly. Accordingly, the processor 110 sequentially stores the single record, and as a result, an order of the records stored in segment B and an order of the records stored in the cache 310 of segment B may also be the same as each other.

When there is the inquiry request not including the key condition, the processor 110 may store a segment having a specific record as the parent in the cursor 400. For example, when the inquiry request not including the key condition is the child segment having record A1 as the parent, the processor 110 stores in the cursor 400 records B1, B2, B3, and B4 having record A1 as the parent.

When there is the inquiry request including the key condition, if the record satisfying the inquiry request does not exist in the cache 300, the processor 110 may store the record in the cache 300. For example, when the processor 110 receives a request for inquiring child record B6 having record A3 as the parent, since record B6 is not stored in the cache 310 of segment B as illustrated in FIG. 2, the processor 110 may perform an operation of storing record B6 in the cache 310 of segment B.

The operation of storing the data in the aforementioned cache is just an example and the present disclosure is not limited thereto.

In an exemplary embodiment of the present disclosure, the processor 110 may store record information in the cache 300. The cache 300 may additionally store information related to an address, a record value, etc., of the record searched by the processor 110. For example, when a record which the processor 110 last inquiries among the records included in segment B and returns is B3, the cache 310 of segment B may have information that record B3 is a most recently searched record. Accordingly, when there is an inquiry request for record B3, the processor 110 may rapidly return record B3 by reading the record not from record B1 but from record B3. The aforementioned recent search position storing is just an example and the present disclosure is not limited thereto.

Figure 3:
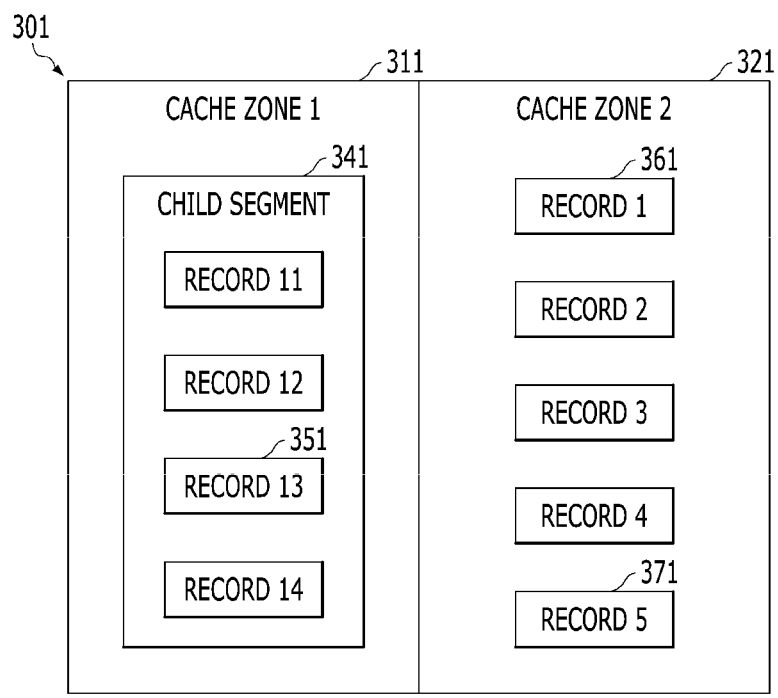
FIG. 3 is an exemplary diagram for describing a configuration of a cache according to an exemplary embodiment of the present disclosure.

FIG. 3 is an exemplary diagram for describing a configuration of a cache according to an exemplary embodiment of the present disclosure.

In an exemplary embodiment of the present disclosure, the cache 300 may be divided into at least two or more zones and operated. Cache zone 1 311 as a part storing the segment may be an area of the cache 300 read when there is the inquiry request not including the key condition. For example, when there is an inquiry request for a child segment 341 of a specific parent record, the processor 110 may read whether there is a segment satisfying the inquiry request by reading cache zone 1 311. In the example illustrated in FIG. 3, when the inquiry request designates the parent record and does not have the key condition for the child record, the processor 110 returns all records of record 11, record 12, record 13, and record 14 included in the child segment 341.

Cache zone 2 321 may be a zone of the cache 300 read when there is the inquiry request including the key condition. For example, when an inquiry request is received, which includes a key condition for inquiring a specific record included in the child segment of the parent record included in the parent segment, the processor 110 may read whether there is the record satisfying the inquiry request by reading cache zone 2 321. In the example illustrated in FIG. 3, when the record satisfying the inquiry request is record 1 361, the processor 110 returns record 1 361. Accordingly, when the processor 110 aligns the records stored in cache zone 2 321 according to a predetermined criterion, a time for reading the specific record may be shortened. The predetermined criterion may be a criterion in which records are aligned so that a record which may be called again within a short time such as the number of inquiry times of the record, an inquiry time, etc., is positioned in an upper part.

The aforementioned cache configuration is just an example and the present disclosure is not limited thereto.

By distinguishing the cache 300 read according to whether the inquiry request includes the key condition, a time when the processor 110 reads the segment and/or data in the cache 300 may be shortened. Furthermore, the data stored in the cache 300 may be effectively operated by efficiently managing the segment and/or record stored in the cache 300. For example, when there is the inquiry request including the key condition, the processor 110 may shorten a time when the processor 110 reads the cache by immediately reading cache zone 2 321 storing only the record without the need of reading all child segments 341 in the cache.

Figure 4:
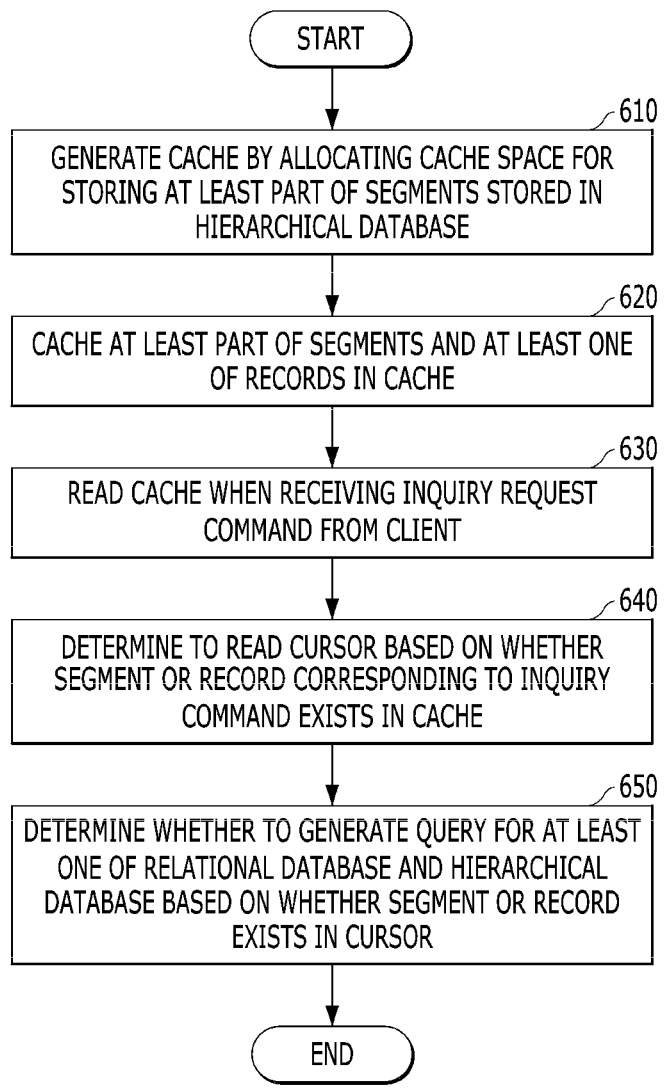
FIG. 4 is a flowchart of a method for caching data according to an exemplary embodiment of the present disclosure.

FIG. 4 is a flowchart of a method for caching data according to an exemplary embodiment of the present disclosure.

The computing device 100 may generate a cache by allocating segments to a cache space for storing at least some of the segments stored in the hierarchical database (610).

In an exemplary embodiment of the present disclosure, the segment may be a node of the hierarchical database mapped with a table of the relational database.

In an exemplary embodiment of the present disclosure, the computing device 100 may exclude at least one record stored in the cache from the cache based on a predetermined criterion.

In an exemplary embodiment of the present disclosure, the computing device 100 may cache at least some of the segments and at least one of the records to the cache (620).

In an exemplary embodiment of the present disclosure, when the inquiry request including the key condition is received, the computing device 100 may store at least some of the segments in the cache when the inquiry request storing the record corresponding to the key condition in the cache or not including the key condition is received.

In an exemplary embodiment of the present disclosure, when the inquiry request not including the key condition is received, an operation of storing at least some of the segments in the cache by the computing device 100 may include an operation of storing the record included in the parent segment and the child segment of the record included in the parent segment in the cache.

In an exemplary embodiment of the present disclosure, the computing device 100 may read the cache when receiving the inquiry request from the client (630).

In an exemplary embodiment of the present disclosure, when receiving the inquiry request from the client, the computing device 100 may read the record corresponding to the key condition in the cache when the inquiry request includes the key condition and read the segment corresponding to the parent record identified in the inquiry request in the cache when the inquiry request does not include the key condition. In an exemplary embodiment of the present disclosure, the computing device 100 may determine to read the cursor based on whether the segment or record corresponding to the inquiry request exists in the cache (640).

In an exemplary embodiment of the present disclosure, when there is the segment or record corresponding to the inquiry request in the cache, the computing device 100 may determine not to read the cursor and return the segment or record corresponding to the inquiry request.

In an exemplary embodiment of the present disclosure, the computing device 100 may determine whether to read the cursor based on whether the segment or record corresponding to the inquiry request does not exist in the cache.

In an exemplary embodiment of the present disclosure, the computing device 100 may determine whether the query for at least one of the relational database and the hierarchical database is generated based on whether there is the segment or record in the cursor (650).

In an exemplary embodiment of the present disclosure, the computing device 100 may not generate the query when there is the segment or record in the cursor and generate the query when at least one of the segment and the record does not exist in the cursor.

In an exemplary embodiment of the present disclosure, the computing device 100 may store in the cache at least one of the segment or the record in response to the query or when obtaining the segment or record from the cursor.

Figure 5:
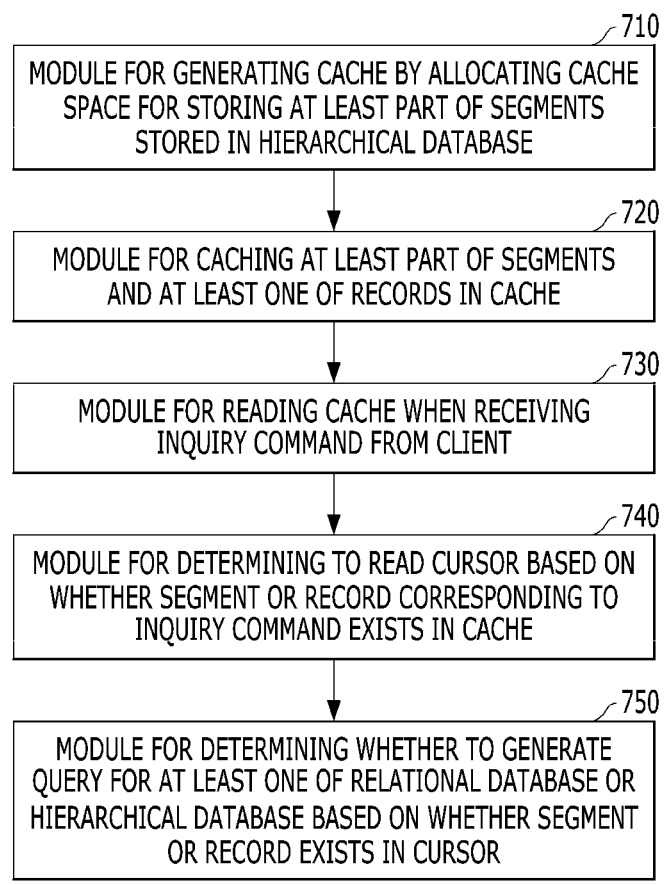
FIG. 5 is a block diagram illustrating a module for implementing a method for caching data according to an exemplary embodiment of the present disclosure.

FIG. 5 is a block diagram illustrating a module for implementing a method for caching data according to an exemplary embodiment of the present disclosure.

The method for caching data of a database according to an exemplary embodiment of the present disclosure may be implemented by the following modules.

In an exemplary embodiment of the present disclosure, the method for caching the data of the database allocates a cache space for storing at least some of segments stored in a hierarchical database to be implemented by a module 710 generating a cache, a module 720 caching at least some of the segments and at least one of records to the cache, a module 730 reading the cache when receiving an inquiry request from a client, a module 740 determining to read a cursor based on whether there is a segment or record corresponding to the inquiry request in the cache; and a module 750 determining whether a query for at least one of a relational database and a hierarchical database is generated based on whether there is the segment or record in the cursor.

In an alternative exemplary embodiment of data caching, the module 720 caching at least one of the segments and at least one of the records in the cache may include a module storing a record corresponding to a key condition in the cache when receiving the inquiry request including a key condition and a module storing at least some of the segments in the cache when the inquiry request that does not include the key condition is received.

In an alternative exemplary embodiment of data caching, when the inquiry request not including the key condition is received, the module storing at least some of the segments may include a module storing the record included in the parent segment and the child segment of the record included in the parent segment in the cache.

In an alternative exemplary embodiment of data caching, the module may further include a module excluding at least one record stored in the cache from the cache based on a predetermined criterion.

In an alternative exemplary embodiment of data caching, when receiving the inquiry request from the client, the module 730 reading the cache may include a module reading the record corresponding to the key condition in the cache when the inquiry request includes the key condition and a module reading the segment corresponding to the parent record identified in the inquiry request in the cache when the inquiry request does not include the key condition.

In an alternative exemplary embodiment of data caching, the module 740 determining to read the cursor based on whether there is the segment or record corresponding to the inquiry request in the cache may include a module determining not to read the cursor when there is the segment or record corresponding to the inquiry request in the cache and returning the segment or record corresponding to the inquiry request.

In an alternative exemplary embodiment of data caching, the module determining to read the cursor based on whether there is the segment or record corresponding to the inquiry request in the cache may include a module determining to read the cursor when there is no segment or record corresponding to the inquiry request in the cache.

In an alternative exemplary embodiment of data caching, the module 750 determining whether the query for at least one of the relational database and the hierarchical database is generated based on whether there is the segment or record in the cursor may include a module determining not to generate the query when there is the segment or record in the cursor and a module determining to generate the query when at least one of the segment and the record does not exist in the cursor.

In an alternative exemplary embodiment of data caching, the module 750 determining whether the query for at least one of the relational database and the hierarchical database is generated based on whether there is the segment or record in the cursor may further include a module storing at least one of the segment or the record in the cache in response to the query or when obtaining the segment or record from the cursor.

According to an exemplary embodiment of the present disclosure, the module for caching the data may be implemented by a means, a circuit, or a logic for implementing the computing device. Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application, but such implementation decisions should not be interpreted as causing a departure from the scope of the present disclosure.

Figure 6:
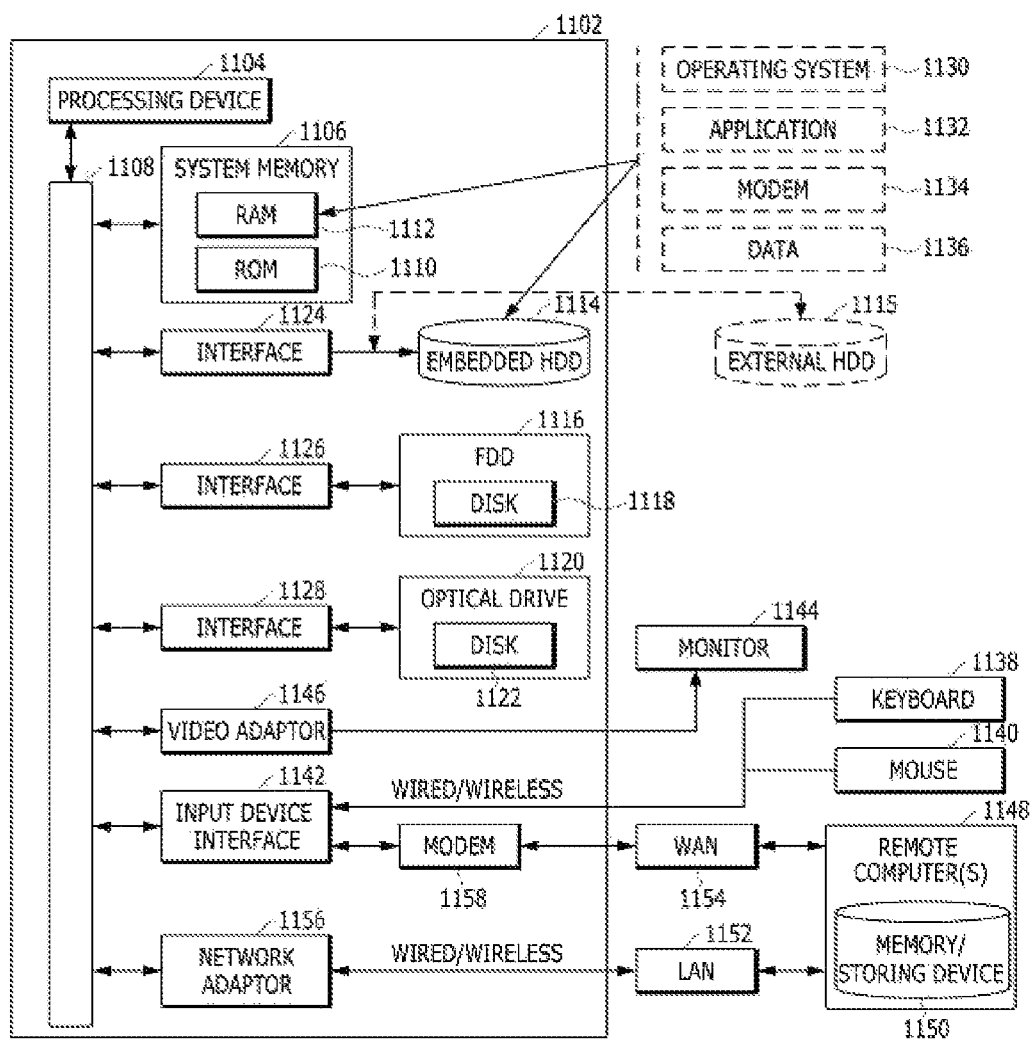
FIG. 6 is a simple and normal schematic view of an exemplary computing environment in which the exemplary embodiments of the present disclosure may be implemented.

FIG. 6 is a simple and normal schematic view of an exemplary computing environment in which the exemplary embodiments of the present disclosure may be implemented.

It is described above that the present disclosure may be generally implemented by the computing device 100, but those skilled in the art will well know that the present disclosure may be implemented in association with a computer executable command which may be executed on one or more computers and/or in combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary and non-temporary media, and movable and non-movable media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Further, various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

What is claimed is:

1. A non-transitory computer readable medium including a computer program, the computer program causing a computer to perform operations for data caching of a database when executed by one or more processors, the operations include:
   reading a cache when receiving an inquiry request from a client;
   determining to read a cursor when the cache does not include a segment or a record corresponding to the inquiry request;
   determining not to generate a query when the segment or the record corresponding to the inquiry request exists in the cursor; and
   determining to generate the query when at least one of the segments or the record corresponding to the inquiry request does not exist in the cursor.

2. The non-transitory computer readable medium according to claim 1, wherein the cache is generated by allocating a cache space for storing at least a part of segments stored in a hierarchical database.

3. The non-transitory computer readable medium according to claim 2, wherein the operations further include
   caching at least a part of the segments stored in the hierarchical database and at least one of records in the cache.

4. The non-transitory computer readable medium according to claim 2, wherein the segment is a node in a hierarchical database mapped to a table in a relational database.

5. The non-transitory computer readable medium according to claim 3,
   wherein the caching at least a part of the segments and at least one of records in the cache includes:
   storing the record corresponding to a key condition in the cache when the inquiry request that includes the key condition is received; and
   storing at least a part of the segments in the cache when the inquiry request that does not include a key condition is received.

6. The non-transitory computer readable medium according to claim 5,
wherein the storing at least a part of the segments in the cache when the inquiry request that does not include a key condition is received includes:
storing a record contained in a parent segment and a child segment of a record included in the parent segment in the cache.

7. The non-transitory computer readable medium according to claim 1, wherein the operations further include:
removing at least one of records stored in the cache from the cache based on a predetermined criterion.

8. The non-transitory computer readable medium according to claim 1,
wherein the reading the cache when receiving an inquiry request from a client includes:
reading a record corresponding to a key condition from the cache when the inquiry request includes the key condition; and
reading a segment corresponding to a parent record identified in the inquiry request from the cache when the inquiry request does not include a key condition.

9. The non-transitory computer readable medium according to claim 1,
wherein the determining to read a cursor based on whether a segment or a record corresponding to the inquiry request exists in the cache includes:
determining not to read the cursor and returning a segment or a record corresponding to the inquiry request, when there is a segment or a record corresponding to the inquiry request in the cache.

10. The non-transitory computer readable medium according to claim 1, wherein the operations further include:
storing in the cache at least a part of the segments or the record, in response to the query or when obtaining a segment or a record from the cursor.

11. A method for data caching of a database, the method comprising:
reading a cache when receiving an inquiry request from a client;
determining to read a cursor when the cache does not include a segment or a record corresponding to the inquiry request;
determining not to generate a query when the segment or the record corresponding to the inquiry request exists in the cursor; and
determining to generate the query when at least one of the segments or the record corresponding to the inquiry request does not exist in the cursor, and
wherein the method is performed by one or more computing devices.

12. A computing device comprising:
a processor including one or more cores; and
a memory;
wherein the processor is configured to:
read a cache when receiving an inquiry request from a client;
determine to read a cursor when the cache does not include a segment or a record corresponding to the inquiry request;
determining not to generate a query when the segment or the record corresponding to the inquiry request exists in the cursor; and
determining to generate the query when at least one of the segments or the record corresponding to the inquiry request does not exist in the cursor.

\* \* \* \* \*